United States Patent
Morimoto et al.

(10) Patent No.: US 9,964,958 B2
(45) Date of Patent: May 8, 2018

(54) DRIVERLESS VEHICLE, AND APPARATUS, SYSTEM, AND METHOD OF VEHICLE CONTROL

(71) Applicants: Ryohta Morimoto, Kanagawa (JP); Kentaroh Kurosu, Kanagawa (JP); Miyo Taniguchi, Kanagawa (JP); Yoshiaki Kawai, Kanagawa (JP); Takashi Enami, Kanagawa (JP); Akira Murakata, Tokyo (JP); Manabu Kodama, Tokyo (JP); Shinya Tanaka, Tokyo (JP)

(72) Inventors: Ryohta Morimoto, Kanagawa (JP); Kentaroh Kurosu, Kanagawa (JP); Miyo Taniguchi, Kanagawa (JP); Yoshiaki Kawai, Kanagawa (JP); Takashi Enami, Kanagawa (JP); Akira Murakata, Tokyo (JP); Manabu Kodama, Tokyo (JP); Shinya Tanaka, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days. days.

(21) Appl. No.: 15/397,716

(22) Filed: Jan. 3, 2017

(65) Prior Publication Data
US 2017/0192438 A1 Jul. 6, 2017

(30) Foreign Application Priority Data
Jan. 5, 2016 (JP) .................. 2016-000695

(51) Int. Cl.
*G05D 1/02* (2006.01)
*B60W 40/13* (2012.01)
(Continued)

(52) U.S. Cl.
CPC ........... *G05D 1/0289* (2013.01); *B60W 40/13* (2013.01); *G05D 1/0088* (2013.01); *G08G 1/161* (2013.01);
(Continued)

(58) Field of Classification Search
CPC .... G05D 1/0289; G05D 1/0088; G08G 1/161; B60W 40/13; B60W 2530/00; B60W 2530/10
See application file for complete search history.

(56) References Cited

U.S. PATENT DOCUMENTS 9,581,997 B1 * 2/2017 Penilla ................. G05D 1/0011
9,610,510 B2 * 4/2017 Comploi ............... A63G 25/00
(Continued)

FOREIGN PATENT DOCUMENTS

JP 7-191747 7/1995
JP 2003-030782 1/2003
(Continued)

*Primary Examiner* — Mussa A Shaawat
(74) *Attorney, Agent, or Firm* — Duft Bornsen & Fettig LLP

(57) ABSTRACT

A vehicle control system determines a travel priority of a vehicle based on a travel condition of the vehicle. In response to detection of an oncoming vehicle ahead of the vehicle along a single guide path, the system compares between the travel priority of the vehicle, and a travel priority of the oncoming vehicle, and selects one of the vehicle and the oncoming vehicle as a vehicle to change a traveling route, to allow the unselected vehicle to continue traveling along the single guide path.

15 Claims, 13 Drawing Sheets

(51) Int. Cl.
*G05D 1/00* (2006.01)
*G08G 1/16* (2006.01)

(52) U.S. Cl.
CPC ..... *B60W 2530/00* (2013.01); *B60W 2530/10* (2013.01)

(56) References Cited

U.S. PATENT DOCUMENTS

| | | | | |
|---|---|---|---|---|
| 2007/0219720 | A1* | 9/2007 | Trepagnier | B60W 30/00 701/300 |
| 2010/0098290 | A1* | 4/2010 | Zhang | B60W 30/00 382/100 |
| 2010/0104199 | A1* | 4/2010 | Zhang | G06K 9/00798 382/199 |
| 2013/0338854 | A1 | 12/2013 | Yamamoto | |
| 2015/0354976 | A1* | 12/2015 | Ferencz | G01C 21/3602 382/104 |
| 2016/0325753 | A1* | 11/2016 | Stein | B60W 40/06 |
| 2017/0017236 | A1* | 1/2017 | Song | G08G 1/164 |
| 2017/0021282 | A1* | 1/2017 | Comploi | A63G 25/00 |
| 2017/0176990 | A1* | 6/2017 | Keller | G01S 17/42 |

FOREIGN PATENT DOCUMENTS

| | | |
|---|---|---|
| JP | 2007-108879 | 4/2007 |
| JP | 2014-002603 | 1/2014 |

\* cited by examiner

DRIVERLESS VEHICLE, AND APPARATUS, SYSTEM, AND METHOD OF VEHICLE CONTROL

CROSS-REFERENCE TO RELATED APPLICATIONS

This patent application is based on and claims priority pursuant to 35 U.S.C. § 119(a) to Japanese Patent Application No. 2016-000695, filed on Jan. 5, 2016, in the Japan Patent Office, the entire disclosure of which is hereby incorporated by reference herein.

BACKGROUND

Technical Field

The present invention relates to a driverless vehicle, and an apparatus, system, and method of controlling the driverless vehicle, and a recording medium.

Description of the Related Art

The known automated guided vehicles that transport loads travel along a guide path, or freely travel while finding a path to a destination according to detection of surroundings.

In case of traveling along the guide path, to save a space, the guide path is often a single path through which a plurality of vehicles travel in one direction, or the plurality of vehicles travel in both directions. In case the vehicles travel in both directions, when two vehicles are about to pass each other, only one vehicle is allowed to move forward along the guide path. For example, the vehicle that travels in one of the directions that is previously set as a prioritized direction is allowed to move forward, and the other vehicle that travels in the other direction moves away from the guide path.

SUMMARY

Example embodiments of the present invention include a driverless vehicle, which determines a travel priority of the vehicle based on a travel condition of the vehicle, the travel condition indicating a condition of the vehicle in traveling according to a traveling route from one location to other location along a single guide path. In response to detection of an oncoming vehicle ahead of the vehicle that travels in a direction opposite of a traveling direction of the vehicle along the single guide path, the vehicle obtains a travel priority of the oncoming driverless vehicle, compares between the travel priority of the vehicle, and the travel priority of the oncoming vehicle, and selects one of the vehicle and the oncoming vehicle as a vehicle to change the traveling route to a different traveling route, to allow the unselected vehicle to continue traveling along the single guide path.

Example embodiments of the present invention include a vehicle control apparatus for controlling travel of a plurality of driverless vehicles, which receives, from each one of the plurality of vehicles, a travel condition of the vehicle through a network, the travel condition indicating a condition of the vehicle in traveling according to a traveling route from one location to other location along a single guide path, and determines, for each one of the plurality of vehicles, a travel priority of the vehicle based on the travel condition of the vehicle. In response to detection of a first vehicle and a second vehicle of the plurality of vehicles that are about to pass each other along the guide path, the apparatus compares between a first travel priority of the first vehicle and a second travel priority of the second vehicle, and selects one of the first vehicle and the second vehicle as a vehicle to change the traveling route to a different traveling route, to allow the unselected vehicle to continue traveling along the single guide path.

Example embodiments of the present invention include a vehicle control system for controlling travel of a plurality of driverless vehicles. The system receives, from each one of the plurality of vehicles, a travel condition of the vehicle through a network, the travel condition indicating a condition of the vehicle in traveling according to a traveling route from one location to other location along a single guide path, and determines, for each one of the plurality of vehicles, a travel priority of the vehicle based on the travel condition of the vehicle. In response to detection of a first vehicle and a second vehicle of the plurality of vehicles that are about to pass each other along the guide path, the system compares between a first travel priority of the first vehicle and a second travel priority of the second vehicle, and selects one of the first vehicle and the second vehicle as a vehicle to change the traveling route to a different traveling route, to allow the unselected vehicle to continue traveling along the single guide path.

Example embodiments of the present invention include a method for controlling travel of a driverless vehicle, performed by any one of the vehicle, the vehicle control apparatus, and the vehicle control system.

Example embodiments of the present invention include a non-transitory recording medium storing a plurality of instructions which, when executed by one or more processors, cause the processors to perform a method for controlling travel of a driverless vehicle.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
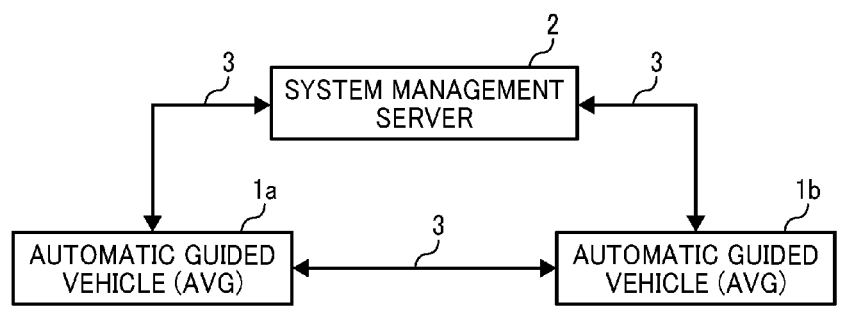
FIG. 1 is a configuration of a vehicle control system, according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring to the drawings, embodiments of the present invention are described. In the vehicle control system according to the embodiments, an automated guided vehicle (AGV) transports loads from one location to another location. The AGV in this disclosure is a driverless vehicle, which travels along a guide path, or freely travels while finding a path to a destination based on detected surroundings, until it reaches the destination. Further, in this disclosure, it is assumed that the guide path is a single path as illustrated in FIG. 2.

Figure 2:
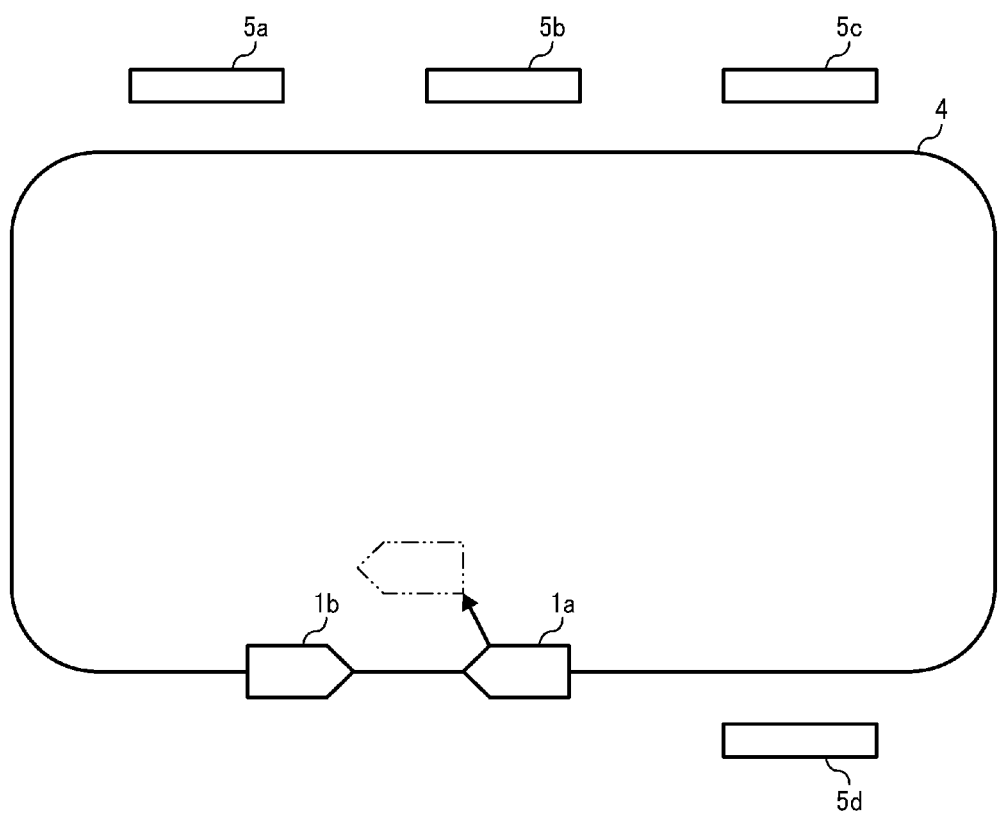
FIG. 2 is an illustration for explaining operation of controlling an automated guided vehicle (AGV), performed by the vehicle control system of FIG. 1, according to an embodiment.

Referring to FIGS. 1 and 2, operation of the vehicle control system is described according to the embodiments.

As illustrated in FIG. 1, the vehicle control system includes a first AGV 1a, a second AGV 1b, and a system management server 2, which are connected through a wireless communication network 3. In the following, the first AGV 1a and the second AGV 1b may be collectively referred to as the AGV 1. The number of AGVs connected to the network 3 is not limited to two, such that any desired number of AGVs may operate in the vehicle control system.

The wireless communication network 3 is any network in compliance with, for example, a Bluetooth (Registered Trademark), Wireless Fidelity (Wi-Fi, Registered Trademark), visible light communication, infrared light communication, etc.

As illustrated in FIG. 2, the vehicle control system of FIG. 1 is provided with a guide path 4, and a plurality of stations 5a, 5b, 5c, and 5d. The AGV 1 travels along the guide path 4 in a guided travel mode, or freely travels based on detected surroundings in an autonomous travel mode. For example, after the loads are loaded onto the AGV 1 at the loading station 5d, the AGV 1 travels to the unloading station 5a, 5b, or 5c to transport the loads. After unloading the loads at the unloading station 5a, 5b, or 5c, the AGV 1 travels back to the loading station 5d. The system management server 2 manages various information regarding the AGV 1.

The guide path 4 may be defined with tape, such as colored tape or magnetic tape. The plurality of AGVs 1 each travel in both directions of right and left along the guide path 4.

Still referring to FIG. 2, in the vehicle control system, when two AGVs 1a and 1b pass each other, only one of the AGVs 1a and 1b is able to go forward along the single guide path 4. In such case, one of the AGVs 1a and 1b having a lower travel priority is programmed to move away from the guide path 4, to let the other one of the AGVs 1a and 1b to continue traveling along the guide path 4. Once the other AGV 1 passes, the AGV 1 that has been waiting returns to the guide path 4. When returning to the guide path 4, the AGV 1 automatically travels in the autonomous travel mode.

Figure 3:
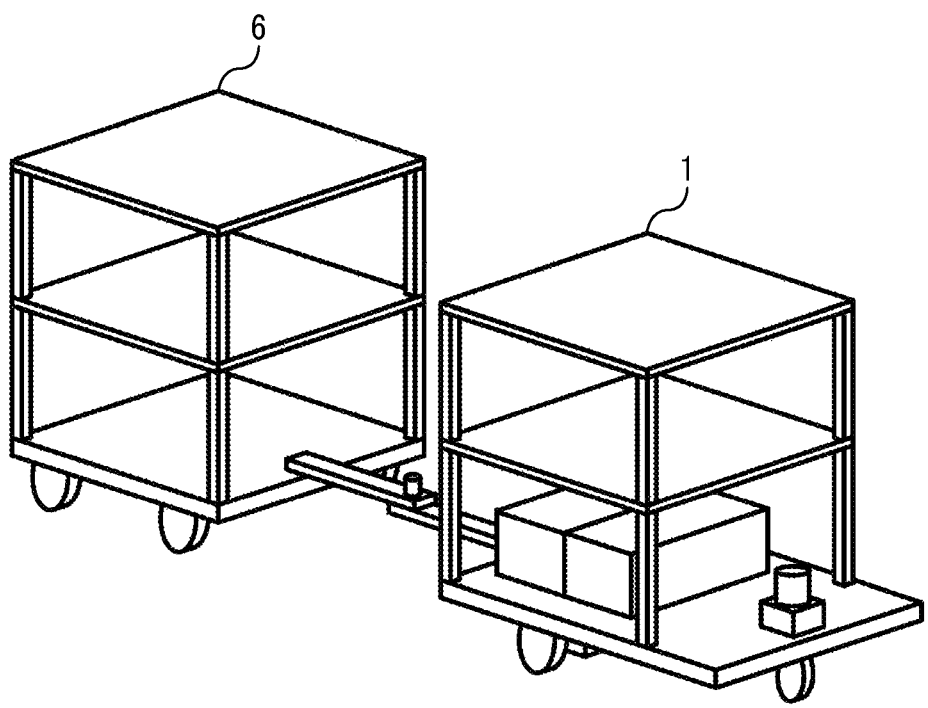
FIG. 3 is a perspective view illustrating the AGV of FIG. 1, according to an embodiment.

FIG. 3 is a perspective view illustrating the AGV 1 when physically connected to a trailer 6 via a connector. The trailer 6, which is connected to the AGV 1, travels along with the AGV 1.

The AGV 1 is provided with a sensor that detects whether the AGV 1 is connected to the trailer 6. Based on a detection result, the AGV 1 is able to determine when the trailer 6 is connected to the AGV 1. With this configuration, the AGV 1 is able to carry loads mounted thereon, and/or mounted on the trailer 6, from one location to another location.

Still referring to FIG. 3, the AGV 1 includes four wheels, which are drive by motors. The number of rotations of the wheels is detected with an encoder, which is then used to estimate a location to be traveled or a traveling direction.

Figure 4:
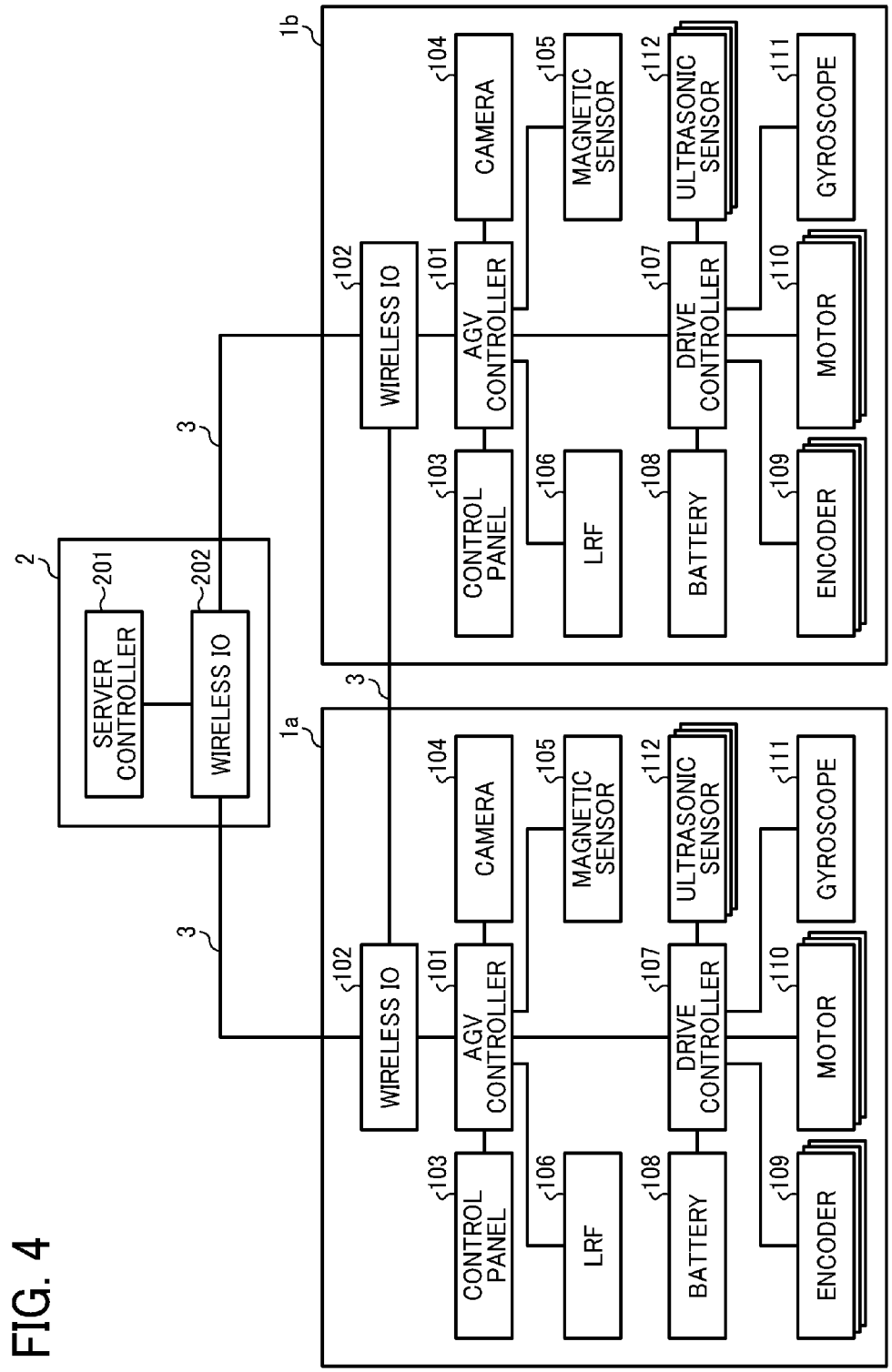
FIG. 4 is a schematic block diagram illustrating a hardware configuration of the AGV and a server of FIG. 1, according to an embodiment.

Referring to FIG. 4, a hardware configuration of the AGV 1 and the system management server 2 is described according to an embodiment. The AGV 1 includes an AGV controller 101, a wireless input/output (IO) 102, a control panel 103, a camera 104, a magnetic sensor 105, a laser range finder (LRF) 106, a drive controller 107, a battery 108, a plurality of encoders 109 ("encoder 109"), a plurality of motors 110 ("motor 110"), and gyroscope 111, and a plurality of ultrasonic sensors 112 ("ultrasonic sensor" 112).

The AGV controller 101 is a general-purpose computer as described below referring to FIG. 5, which operates according to a control program. The AGV controller 101 generates a map according to a user operation on the control panel 103, and stores the generated map in its internal memory. The control panel 103 is any user interface that allows a user input, or outputs information to the user. In the autonomous travel mode, the AGV controller 101 determines a traveling route to a destination using information obtained from the map, determines a traveling speed, and instructs the drive controller 107 to drive the AGV 1 to the destination based on the traveling route and the traveling speed. The AGV controller 101 is connected to the camera 104 and the magnetic sensor 105, each of which functions as a guide path detector. The camera 104 captures an image of the colored tape to detect the guide path 4. The magnetic sensor 105 detects the magnetic tape to detect the guide path 4.

The AGV controller 101 detects surroundings of the AGV 1 using the LRF 106 and the ultrasonic sensor 112, for example, when generating a map by user operation or when detecting an object in the autonomous travel mode.

The drive controller 107 is a general-purpose computer as described below referring to FIG. 5, which operates according to a control program. The drive controller 107, which is connected to the AGV controller 101, receives information regarding the traveling route and the traveling speed from the AGV controller 101, and drives the motor 110 according to the received information to rotate the wheels. The drive controller 107 further detects a number of rotations of the wheels with the encoder 109, and feeds back the detection result to the AGV controller 101. The drive controller 107 is further connected to the ultrasonic sensor 112 and the gyroscope 111. The drive controller 107 requests the ultrasonic sensor 112 for information regarding surroundings, and the gyroscope 111 for location information of the AGV 1, and feeds back the obtained information to the AGV controller 101. The information regarding surroundings and the location information may be obtained at any desired time, for example, every predetermined time.

When controlling the motor 110 based on the traveling route, the drive controller 107 receives information regarding surroundings from the ultrasonic sensor 112 such that it is capable of recognizing an oncoming object. In case the oncoming object is detected ahead of the AGV 1, the drive controller 107 controls the motor 110 to decrease the traveling speed of the AGV 1 or stop.

As described above, the drive controller 107 includes a central processing unit (CPU), which independently operates from a CPU provided in the AGV controller 101. This enables the drive controller 107 to constantly drive the motor 110, even when a resource of the CPU of the AGV controller 101 is being used.

The battery 108 supplies electric power to various components such as modules of the AGV 1.

The AGV controller 101 determines a travel priority of the AGV 1, and exchanges the travel priority with other AGV 1 via the wireless IO 102 through the wireless communication network 3. The wireless IO 102 is a communication network interface, which allows the AGV 1 to perform wireless communication with the outside apparatus such as the other AGV 1 and the system management server 2 through the network 3. The AGV controller 101 controls traveling based on comparison between its travel priority and the other one's travel priority.

The system management server 2 includes a server controller 201 and a wireless input/output (IO) 202. The server controller 201 is a general-purpose computer that operates according to a control program. The wireless IO 202 is a communication network interface, which allows the server 2 to perform wireless communication with the outside apparatus through the network 3. The system management server 2 is connected to the plurality of AGVs 1 via the wireless IO 202, through the wireless communication network 3. The system management server 2 receives, from each AGV 1, various information regarding a travel condition of the AGV 1. Examples of travel condition information include, but not limited to, the traveling route, the location information, information indicating presence of the load, and information indicating connection to the trailer 6. In one example operation, based on the travel condition information, the server controller 201 determines the travel priority of each AGV 1 in the vehicle control system. The server controller 201 then sends information regarding the travel priority to each AGV 1 to instruct each AGV 1 to travel according to the travel priority. In such case, the AGV controller 101 of each AGV 1 does not have to determine a travel priority of its own.

Figure 5:
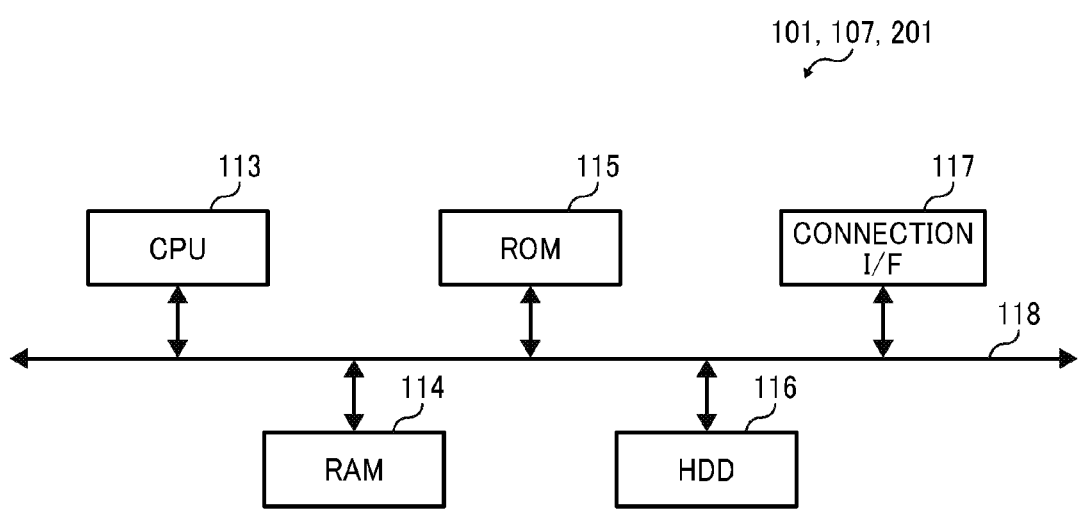
FIG. 5 is a schematic block diagram illustrating a controller of FIG. 4, according to an embodiment.

Referring to FIG. 5, a hardware configuration of a controller, that is, the AGV controller 101, the drive controller 107, and the server controller 201 is described according to an embodiment. For the descriptive purposes, in FIG. 5, the AGV controller 101, the drive controller 107, and the server controller 201 is collectively referred to as the controller.

As illustrated in FIG. 5, the controller includes a central processing unit (CPU) 113, a random access memory (RAM) 114, a read only memory (ROM) 115, a hard disk drive (HDD) 116, and a connection interface (I/F) 117, which are connected via a bus 118.

The CPU 113 is a computing unit, which controls entire operation of the controller. The RAM 114 is a volatile memory capable of writing or reading data at high speed, which functions as a work memory for the CPU 113. The ROM 115 is a read only volatile memory, which stores various programs such as firmware.

The HDD 116 is a writable and readable non-volatile memory, which stores various programs such as an operating system (OS), various control programs, and application programs.

The connection I/F 117 is an interface that connects various peripheral devices. For example, in the case of the AGV controller 101, the connection I/F 117 connects the wireless IO 102, control panel 103, camera 104, magnetic sensor 105, LRF 106, drive controller 107, etc., to the AGV controller 101. The connection I/F 117 may be in compliance with a universal serial bus (USB), Bluetooth, Infrared Data Association (IrDA), video graphics array (VGA), digital visual interface (DVI), and High-Definition Multimedia Interface (HDMI).

In operation, the CPU 113 reads the control program stored in the ROM 115, HDD 116, or a removable recording medium such as an optical disc, onto the RAM 114, to perform various operations or functions according to the read control program as described below.

Figure 6:
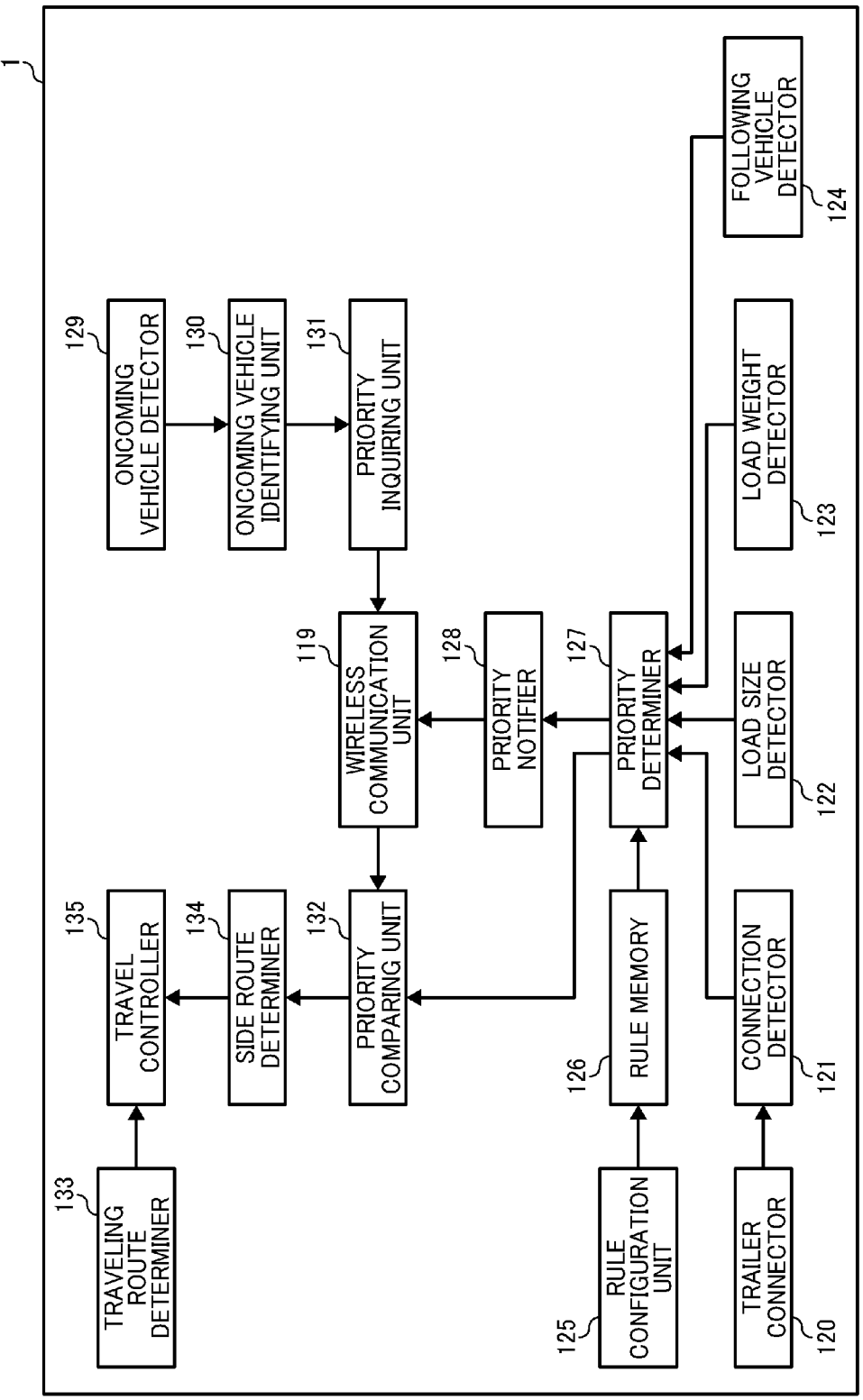
FIG. 6 is a schematic block diagram illustrating a functional configuration of the AGV, according to an embodiment.

Referring to FIG. 6, a functional configuration of the AGV 1 is described according to an embodiment.

As illustrated in FIG. 6, the AGV 1 includes a wireless communication unit 119, a trailer connector 120, a connection detector 121, a load size detector 122, a load weight detector 123, a following vehicle detector 124, a rule configuration unit 125, a rule memory 126, a priority determiner 127, a priority notifier 128, an oncoming vehicle detector 129, an oncoming vehicle identifying unit 130, a priority inquiring unit 131, a priority comparing unit 132, a traveling route determiner 133, a side route determiner 134, and a travel controller 135.

The wireless communication unit 119 communicates with the other AGV 1 or the system management server 2 through the wireless communication network 3. The wireless communication unit 119 is implemented by the wireless IO 102. The trailer connector 120 is a connector that connects the AGV 1 with the trailer 6 (FIG. 3). The connection detector 121, which may be implemented by a switch or an infrared sensor, detects a connection state of the trailer connector 120 to determine whether the trailer connector 120 is connected to the trailer 6.

The load size detector 122, which may be implemented by a switch or an infrared sensor, detects a size of the load mounted on the AGV 1. The load weight detector 123, which may be implemented by a weight sensor, detects a weight of the load mounted on the AGV 1. Any one of the load size detector 122 and the load weight detector 123 may detect presence of the load mounted on the AGV 1.

The following vehicle detector 124 detects any subsequent vehicle that is traveling in the same direction, and may be implemented by, for example, an infrared sensor, LRF 106, ultrasonic sensor 112, or camera 104. The rule configuration unit 125, which may be implemented by the AGV controller 101, configures a rule to be used for determining the travel priority ("travel priority rule"), according to a user operation on the control panel 103, and stores the travel priority rule in the rule memory 126. The rule memory 126, which may be implemented by any desired memory of the AGV 1 such as the RAM 114, stores the travel priority rule.

The priority determiner 127, implemented by the AGV controller 101, obtains various travel condition information of the AGV 1, and determines the travel priority according to the travel priority rule stored in the rule memory 126. The operation of determining the travel priority is described below referring to FIG. 8.

The priority notifier 128, implemented by the AGV controller 101, sends a notification indicating the determined travel priority, which is determined by the priority determiner 127, to the other AGV 1 or the system management server 2 through the wireless communication unit 119. The oncoming vehicle detector 129 detects any oncoming vehicle using, for example, the infrared sensor, LRF 106, ultrasonic sensor 112, or camera 104. In this example, the oncoming vehicle is detected, when the vehicle reaches a predetermined distance from the local vehicle. In such case, the oncoming vehicle is determined as the vehicle that is about to pass the local vehicle.

The oncoming vehicle identifying unit 130, implemented by the AGV controller 101, identifies the oncoming vehicle, which is detected by the oncoming vehicle detector 129. More specifically, each AGV 1 is attached with a vehicle identifier in the form of a character, mark, barcode, QR code, etc. The oncoming vehicle identifying unit 130 reads the vehicle identifier using, for example, the camera 104 or a barcode reader to analyze the read identifier, and identifies the AGV 1 based on the analysis. Alternatively, the oncoming vehicle identifying unit 130 may identify the oncoming vehicle, based on identification information (vehicle identifier) transmitted from the oncoming vehicle via any desired communication based on Bluetooth, Wi-Fi, visible light communication, or infrared communication.

Even when there are more than three AGVs 1 that are simultaneously traveling, the AGV 1 is able to identify the oncoming AGV 1 based on the vehicle identifier. Once the oncoming AGV 1 is identified, the AGV 1 does not have to communicate with any AGV 1 other than the oncoming AGV 1, thus reducing a traffic of data among the AGVs 1.

The priority inquiring unit 131, implemented by the AGV controller 101, causes the wireless communication unit 119 to send a request for travel priority, to the oncoming AGV 1 identified by the oncoming vehicle identifying unit 130, or to the system management server 2. The priority comparing unit 132, implemented by the AGV controller 101, obtains the travel priority of the oncoming AGV 1 in response to the request, and compares the obtained travel priority with the travel priority of its own. Based on the comparison, the priority comparing unit 132 determines which one of the AGVs 1 should continue traveling, and which one of the AGVs 1 should go to a side route.

The traveling route determiner 133, implemented by the AGV controller 101, determines the traveling route of the AGV 1. The side route determiner 134, implemented by the AGV controller 101, determines a side route of the AGV 1, when the priority comparing unit 132 determines that the travel priority of its own is lower than that of the oncoming AGV 1. The side route is any route, which is off the guide path 4. The travel controller 135, implemented by the AGV controller 101, controls the AGV 1 to travel according to the traveling route determined by the traveling route determiner 133, or travel according to the side route determined by the side route determiner 134.

Figure 7A:
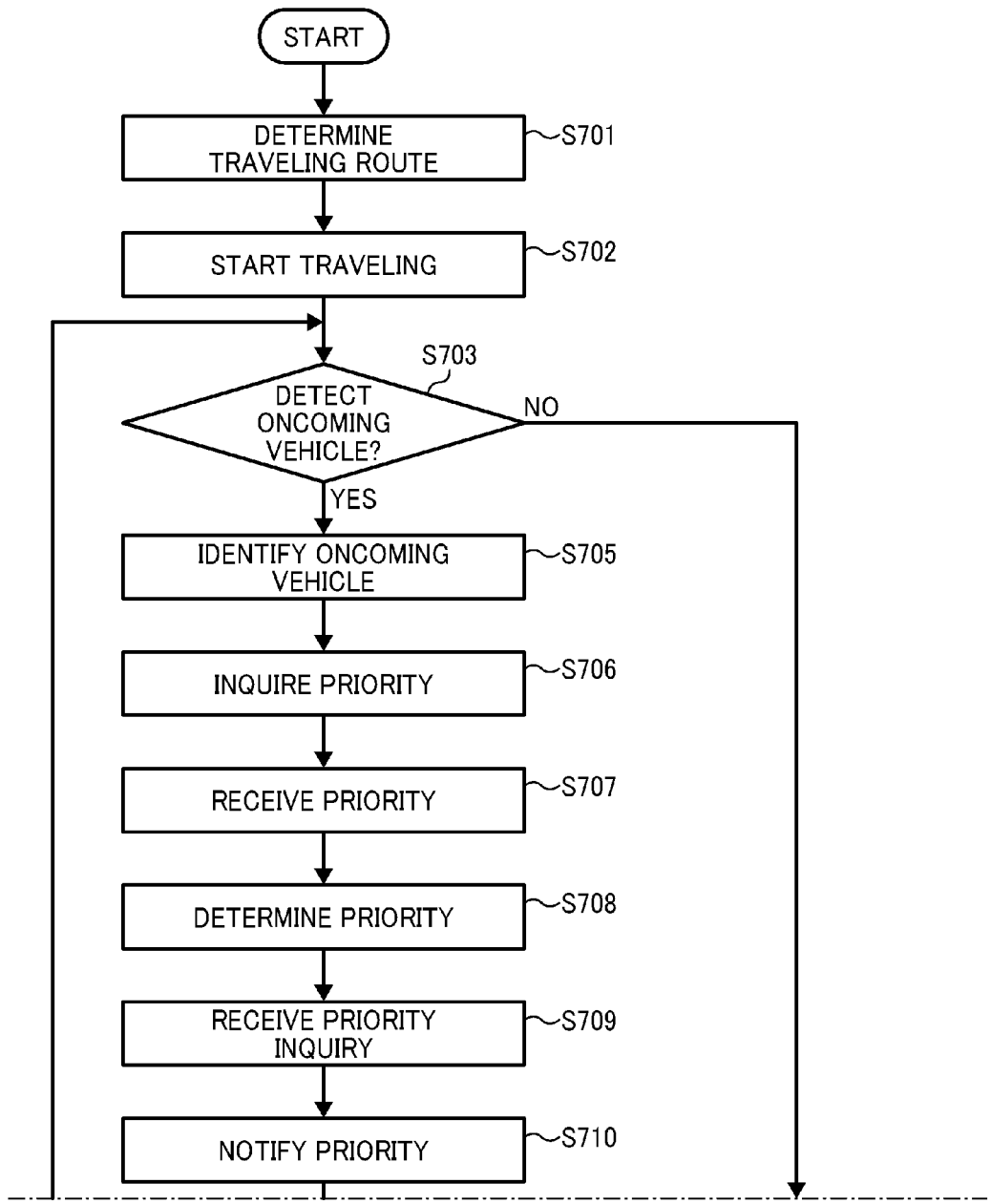
FIGS. 7A-7B are a flowchart illustrating operation of controlling the AGV, according to the embodiment.
Figure 7B:
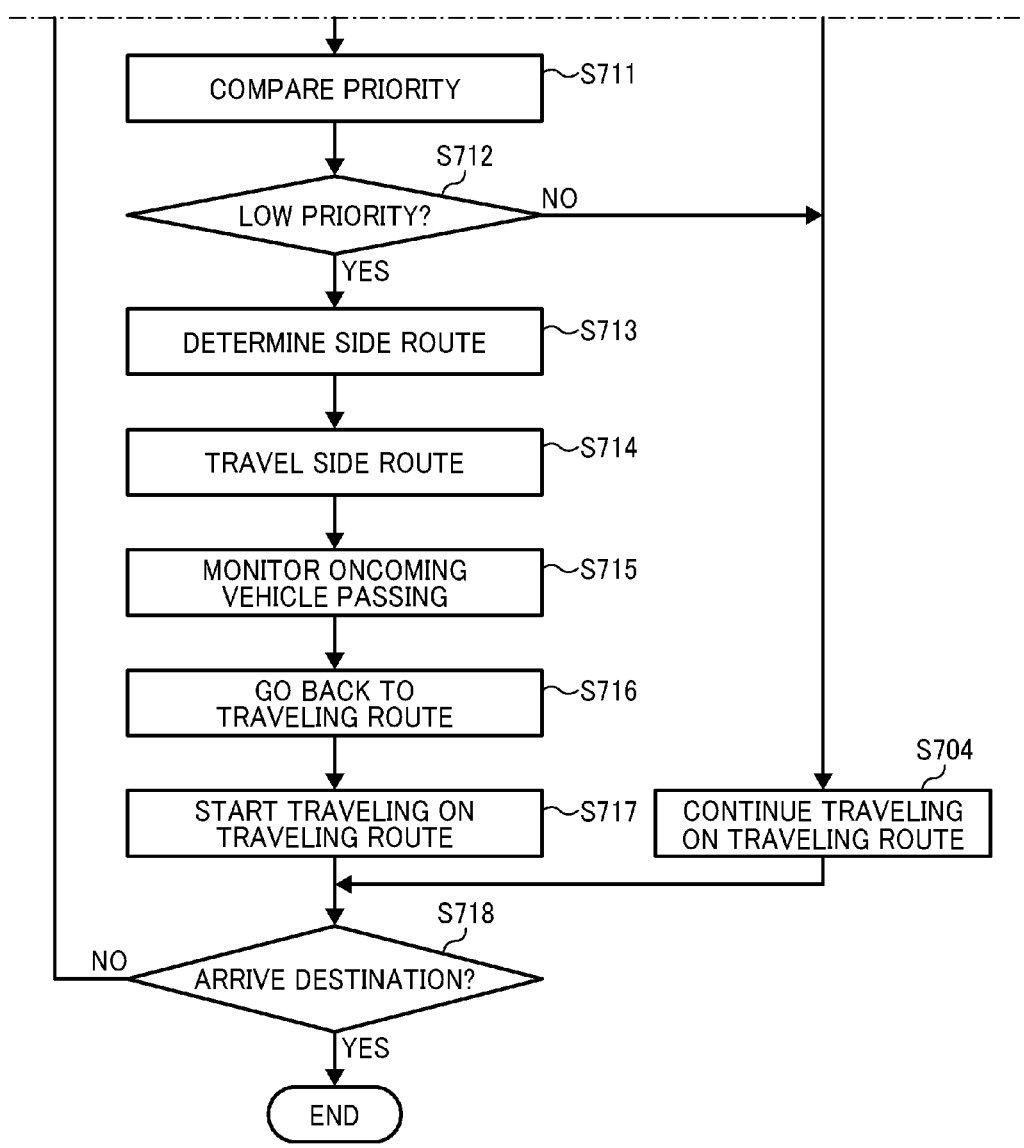

Referring now to FIGS. 7A-7B, operation of controlling travel of the AGV 1, performed by the AGV 1, is described according to an embodiment.

At S701, the traveling route determiner 133 determines a traveling route of the AGV 1. For example, a destination may be previously set according to a user operation on the control panel 103 or at the server 2. Based on the previously set destination, the traveling route determiner 133 determines the traveling route from the current location to the destination.

At S702, the travel controller 135 causes the AGV 1 to start traveling according to the traveling route determined at S701.

At S703, the oncoming vehicle detector 129 detects any oncoming vehicle ahead of the AGV 1, while the AGV 1 travels along the guide path 4 according to the traveling route.

When no oncoming vehicle is detected ("NO" at S703), the operation proceeds to S704 to control the AGV 1 to continue traveling according to the traveling route.

When any oncoming vehicle is detected ("YES" at S703), the operation proceeds to S705 to cause the oncoming vehicle identifying unit 130 to identify the oncoming vehicle.

At S706, the priority inquiring unit 131 sends a request for travel priority, to the oncoming AGV 1 that is identified at S705 via the wireless communication unit 119. In alternative to sending a request for travel priority to the oncoming vehicle that is detected, each AGV 1 in the system may be programmed to send information indicating the travel priority to other AGV 1, every predetermined time or when the travel priority is changed.

At S707, the wireless communication unit 119 receives a response indicating the travel priority from the oncoming vehicle in response to the request at S706, and notifies the priority comparing unit 132 of the received travel priority of the oncoming vehicle.

At S708, the priority determiner 127 determines the travel priority of its own, and notifies the travel priority notifier 128 and the priority comparing unit 132 of its own travel priority. The operation of determining a travel priority is described below referring to FIG. 8.

At S709, the priority notifier 128 receives a request for travel priority, which is received from the oncoming vehicle via the wireless communication unit 119. At S710, the priority notifier 128 sends a response indicating its own travel priority, which is determined at S708, to the oncoming vehicle in response to the request via the wireless communication unit 119.

At S711, the priority comparing unit 132 compares between the travel priority of the oncoming vehicle that is received at S707, and the travel priority of its own that is determined at S708.

At S712, the travel controller 135 determines whether the comparison result at S711 indicates whether the local AGV 1 has a travel priority less than that of the oncoming vehicle. When it is determined that the local AGV 1 has a travel priority higher than that of the oncoming vehicle ("NO" at S712), the operation proceeds to S704 to control the AGV 1 to continue traveling according to the traveling route.

On the other hand, when it is determined that the local AGV 1 has a travel priority lower than that of the oncoming vehicle ("YES" at S712), the operation proceeds to S713 to determine a side route, off the traveling route that is determined at S701.

At S714, the travel controller 135 controls the AGV 1 to travel in the autonomous travel mode according to the side route determined at S713. As the travel controller 135 detects the oncoming vehicle passing at S715, at S716, controls the AGV 1 to move back to the guide path 4 to continue traveling according to the traveling route determined at S701.

The AGV 1 is programmed to travel in the autonomous travel mode, when changing a route to travel from the original traveling route to the side route, to move away from the guide path 4 at least for a time period until the oncoming vehicle passes. As one of the AGVs 1 determines to move away from the guide path 4, two AGVs 1 are able to pass each other even they travel along the single guide path 4.

That is, the AGV 1 travels in the guided travel mode along the guide path 4 when there is no oncoming vehicle ahead, but the AGV 1 travels in the autonomous travel mode to move away from the guide path 4 when there is an oncoming vehicle that has a higher travel priority than its own travel priority. This eliminates a need for the accurate measuring device, thus reducing a cost for installing the vehicle control system. Since the AGV 1 that determines to move away from the guide path 4, only travels for a short distance according to the side traveling route, an error in measurement by the measuring device would not affect much.

After the AGV 1 moves back to the guide path 4, at S717, the travel controller 135 causes the AGV 1 to continue traveling according to the traveling route determined at S701.

Until the AGV 1 reaches a destination ("NO" at S718), the above-described S703 to S717 are repeated. When the AGV 1 reaches the destination ("YES" at S718), the travel controller 135 causes the AGV 1 to stop traveling, and the operation ends.

Figure 8:
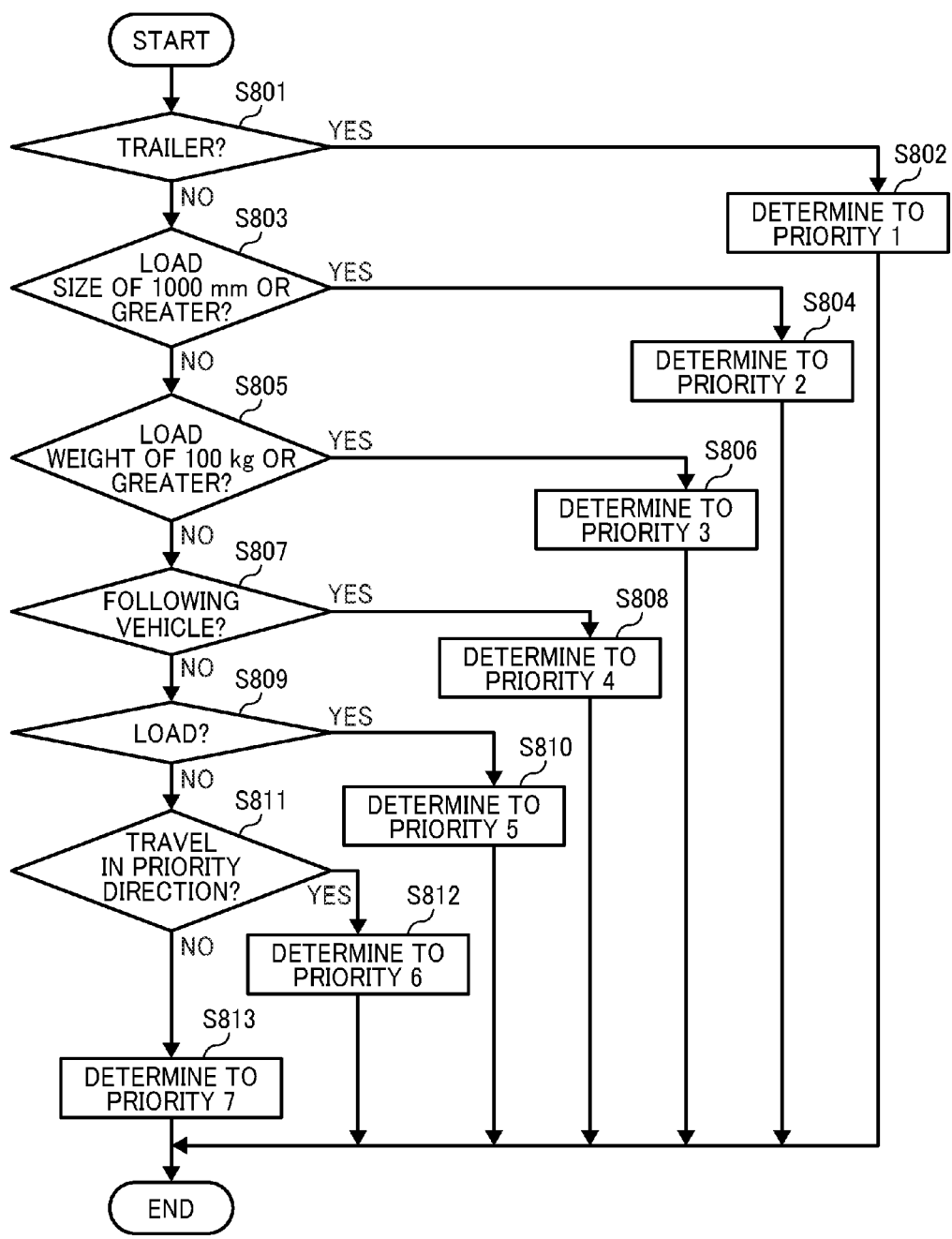
FIG. 8 is a flowchart illustrating operation of determining a priority in traveling, performed by the AGV or the server, according to an embodiment.

Referring to FIG. 8, operation of determining a travel priority, performed by the priority determiner 127, is described according to an embodiment. In this example, the travel priority with a smaller number has a higher priority than the travel priority with a greater number.

At S801, the priority determiner 127 determines whether the local AGV 1 is connected to the trailer 6.

When it is determined that the local AGV 1 is connected to the trailer 6 ("YES" at S801), the operation proceeds to S802 to determine that the local AGV 1 has a travel priority of "1". The AGV 1 connected with the trailer 6 can hardly turn in a smaller turning circle. If such AGV 1 were to move away from the guide path 4, a relatively large space will be necessary for the side traveling route. For this reasons, the AGV 1 with the trailer 6 is programmed to travel along the guide path 4 with the higher priority. Accordingly, a space needed for operating the AGV 1 can be made smaller, while improving efficiency in transporting the load.

On the other hand, when it is determined that the local AGV 1 is not connected to the trailer 6 ("NO" at S801), the operation proceeds to S803. At S803, the priority determiner 127 determines whether the AGV 1 is mounted with the load having a size of 1000 mm or greater.

When it is determined that the size of the load is 1000 mm or greater ("YES" at S803), the operation proceeds to S804 to determine that the local AGV 1 has a travel priority of "2". The AGV 1 with a load that is large in size can hardly turn in a smaller turning circle. If such AGV 1 were to move away from the guide path 4, a relatively large space will be necessary for the side traveling route. For this reasons, the AGV 1 with the large-size load is programmed to travel along the guide path 4 with the higher priority. Accordingly, a space needed for operating the AGV 1 can be made smaller, while improving efficiency in transporting the load.

In contrary, when it is determined that the size of the load is less than 1000 mm ("NO" at S803), the operation proceeds to S805. At S805, the priority determiner 127 determines whether the AGV 1 is mounted with the load that weights 100 kg or greater.

When it is determined that the weight of the load is 100 kg or greater ("YES" at S805), the operation proceeds to S806 to determine that the local AGV 1 has a travel priority of "3". The AGV 1 with a load that is heavy in weight can hardly turn in a smaller turning circle. If such AGV 1 were to move away from the guide path 4, a relatively large space will be necessary for the side traveling route. For this reasons, the AGV 1 with the heavy load is programmed to travel along the guide path 4 with the higher priority. Accordingly, a space needed for operating the AGV 1 can be made smaller, while improving efficiency in transporting the load.

In contrary, when it is determined that the weight of the load is less than 100 kg ("NO" at S805), the operation proceeds to S807 to determine whether the AGV 1 is followed by one or more vehicles.

When it is determined that there is one or more following vehicles after the AGV 1 ("YES" at S807), the operation proceeds to S808 to determine that the local AGV 1 has a travel priority of "4". If the AGV 1 is followed by one or more vehicles that all travel in the same direction, all of these AGVs 1 need to move away from the guide path 4, requiring a relatively large space for the side traveling route. For this reasons, the AGV 1 followed by one or more vehicles is programmed to travel along the guide path 4 with the higher priority. Accordingly, a space needed for operating the AGV 1 can be made smaller, while improving efficiency in transporting the load.

In contrary, when it is determined that the AGV 1 is not followed by any vehicle ("NO" at S807), the operation proceeds to S809 to determine whether the local AGV 1 is mounted with the load.

When it is determined that the local AGV 1 has the load ("YES" at S809), the operation proceeds to S810 to determine that the local AGV 1 has a travel priority of "5". If the AGV 1 with no load is selected to travel with a higher priority than the AGV 1 with a load, transportation of the load may delay. For this reasons, the AGV 1 with a load is programmed to travel along the guide path 4 with the higher priority.

Alternatively, the AGV 1 with no load may be programmed to travel along the guide path 4 with the higher priority. In such case, a number of AGVs 1 with no load at a time, can be decreased, thus improving efficiency in transportation.

In contrary, when it is determined that the local AGV 1 does not have any load ("NO" at S809), the operation proceeds to S811 to determine whether the local AGV 1 travels in a traveling direction that is previously set as a prioritized direction. The prioritized direction is one of the directions, right or left, which is previously set by, for example, an administrator of the vehicle control system.

When it is determined that the local AGV 1 travels in the prioritized direction ("YES" at S811), the operation proceeds to S812 to determine that the local AGV 1 has a travel priority of "6".

In contrary, when it is determined that the local AGV 1 does not travel in the prioritized direction ("NO" at S811), the operation proceeds to S813 to determine that the local AGV 1 has a travel priority of "7".

As described above, the AGV 1 determines a travel priority of the local AGV 1 based on various travel conditions including information indicating whether the AGV 1 is connected to the trailer 6, presence of a load, size or weight of the load, and presence of any following vehicle. The other examples of travel conditions include, but not limited to, a traveling location, traveling distance, traveling direction, and traveling speed of the AGV 1.

Moreover, a rule for determining the priority order is not limited to the example described above referring to FIG. 8, such that the priority order may be modified according to specific application of the vehicle control system.

Further, the order of priority may be set for all of the vehicles being managed by the system management server 2, or individually managed by each AGV 1. Furthermore, the order of priority may be set the same for all of the vehicles in the vehicle control system, or may be set for each AGV 1.

In operation, the rule configuration unit 125 may configure a specific rule for determining the priority order according to a user operation, and stores such rule as a rule to be applied to the local AGV 1 in the rule memory 126. Alternatively, the system management server 2 may configure a specific rule for determining the priority order according to a user operation, and stores such rule in its memory as a rule to be applied to, for example, a specific AGV 1 or all of AGVs 1.

In the above-described embodiment referring to FIGS. 3 to 8, the AGV 1 controls the oncoming vehicle detector 129 to detect any oncoming vehicle, and the oncoming identifying unit 130 to identify the detected oncoming vehicle.

Alternatively, the AGV 1 may detect an oncoming vehicle based on a location and a traveling direction of the other vehicle, which is measured with a location and direction measuring device of the other vehicle. Further, based on identification information transmitted from each vehicle, the AGV 1 may identify the oncoming vehicle.

Figure 9:
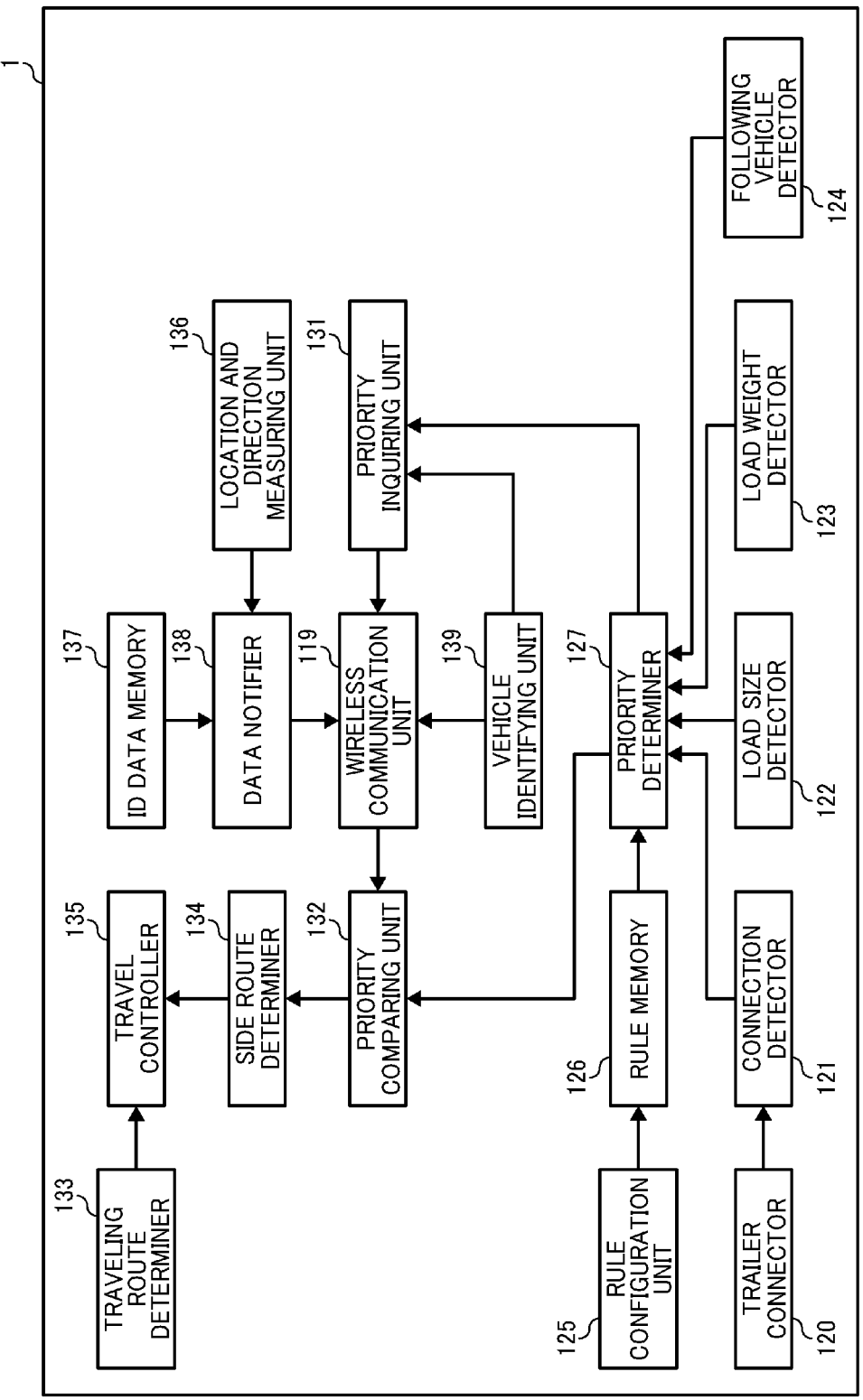
FIG. 9 is a schematic block diagram illustrating a functional configuration of the AGV, according to an embodiment.

Referring to FIG. 9, a functional configuration of the AGV 1 is described according to an embodiment. The AGV 1 of FIG. 9 is substantially similar in configuration to the AGV 1 of FIG. 6, except for some differences. The differences include omission of the oncoming vehicle detector 129 and the oncoming vehicle identifying unit 130, and addition of a location and direction measuring unit 136, an identification (ID) data memory 137, a data notifier 138, and a vehicle identifying unit 139.

The location and direction measuring unit 136 obtains location information indicating a current location of the local AGV 1, and direction information indicating a traveling direction of the local AGV 1. For example, the location and direction measuring unit 136 may obtain the location information and direction information using the encoder 109, an indoor positioning system (IPS), an outdoor global positioning system (GPS), information read from the magnetic tape as the guide path 4, information read from marks on the floor, etc. The location information may be expressed as a XY coordinate on the map, or a distance from the origin on the traveling route. The location and direction measuring unit 136 may be implemented by the encoder 109, the camera 104, magnetic sensor 105, or a GPS receiver.

In the embodiment described above referring to FIG. 6, the oncoming vehicle detector 129, which may be implemented by the camera 104, for example, may not be able to detect the following vehicle, if such vehicle is hidden by the leading vehicle to fall within a blind spot.

Since the oncoming vehicle is detected based on the location information and the direction information in this embodiment of FIG. 9, the detection accuracy increases.

The ID data memory 137, which may be any desired memory, stores an identifier (identification information) for identifying the local AGV 1. The data notifier 138, implemented by the AVG controller 101, causes the wireless communication unit 119 to transmit the location information, the direction information, and the identification information of the local AGV 1, to the other AGV 1 or system management server 2.

The vehicle identifying unit 139, implemented by the AGV controller 101, receives location information, direction information, and identification information of the other AGV 1, which are received from the other AGV 1, through the wireless communication unit 119. The vehicle identifying unit 139 detects the location and the traveling direction of the other AGV 1, based on the received location and direction information. The vehicle identifying unit 139 further identifies each AGV 1 based on the identification information received from each AGV 1.

The vehicle identifying unit 139 determines whether there is any oncoming vehicle, based on the location information and the direction information received from each vehicle. When it is determined that there is at least one oncoming vehicle, the vehicle identifying unit 139 identifies such oncoming vehicle based on the received identification information.

Figure 10A:
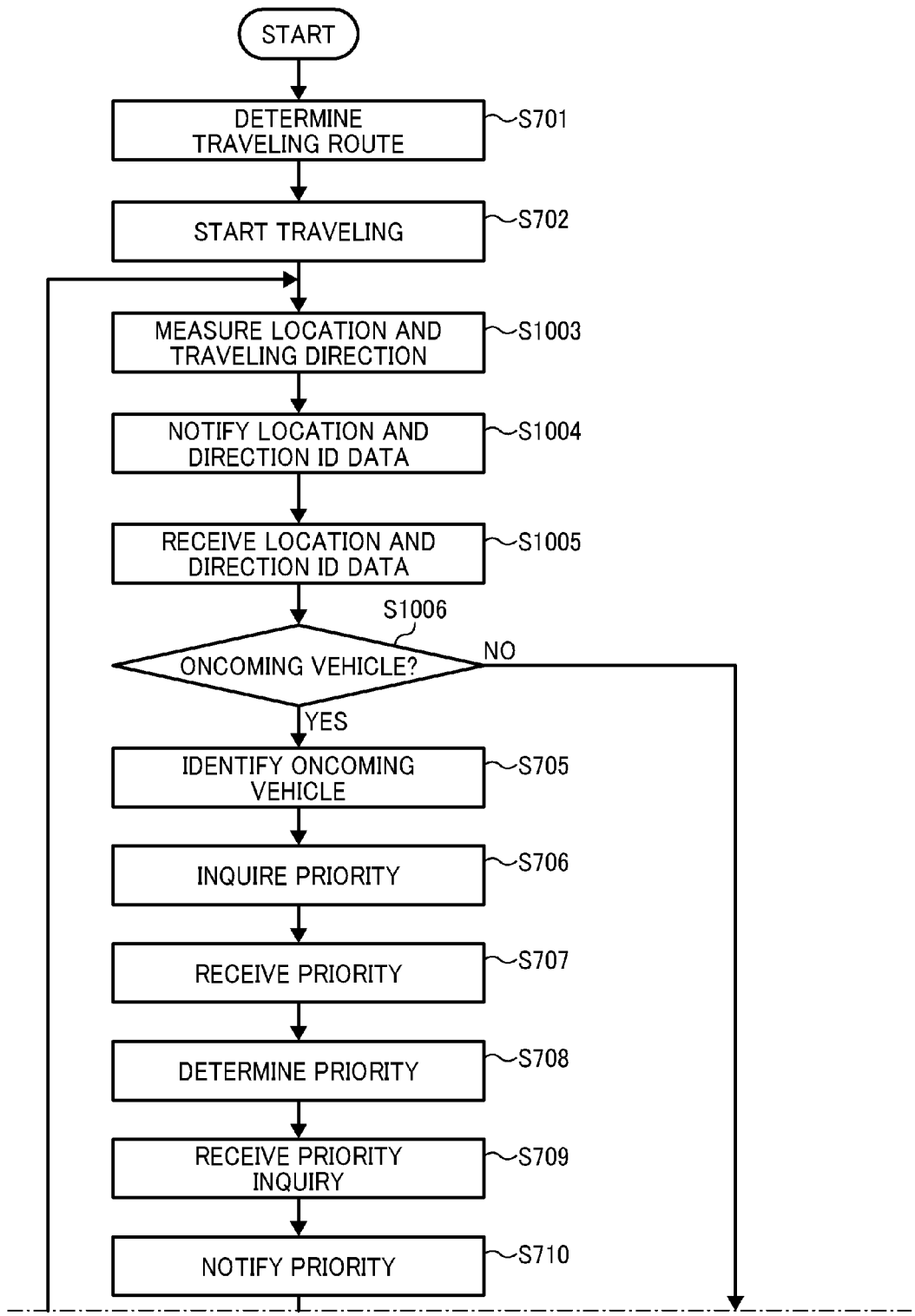
FIGS. 10A-10B are a flowchart illustrating operation of controlling the AGV, according to an embodiment.
Figure 10B:
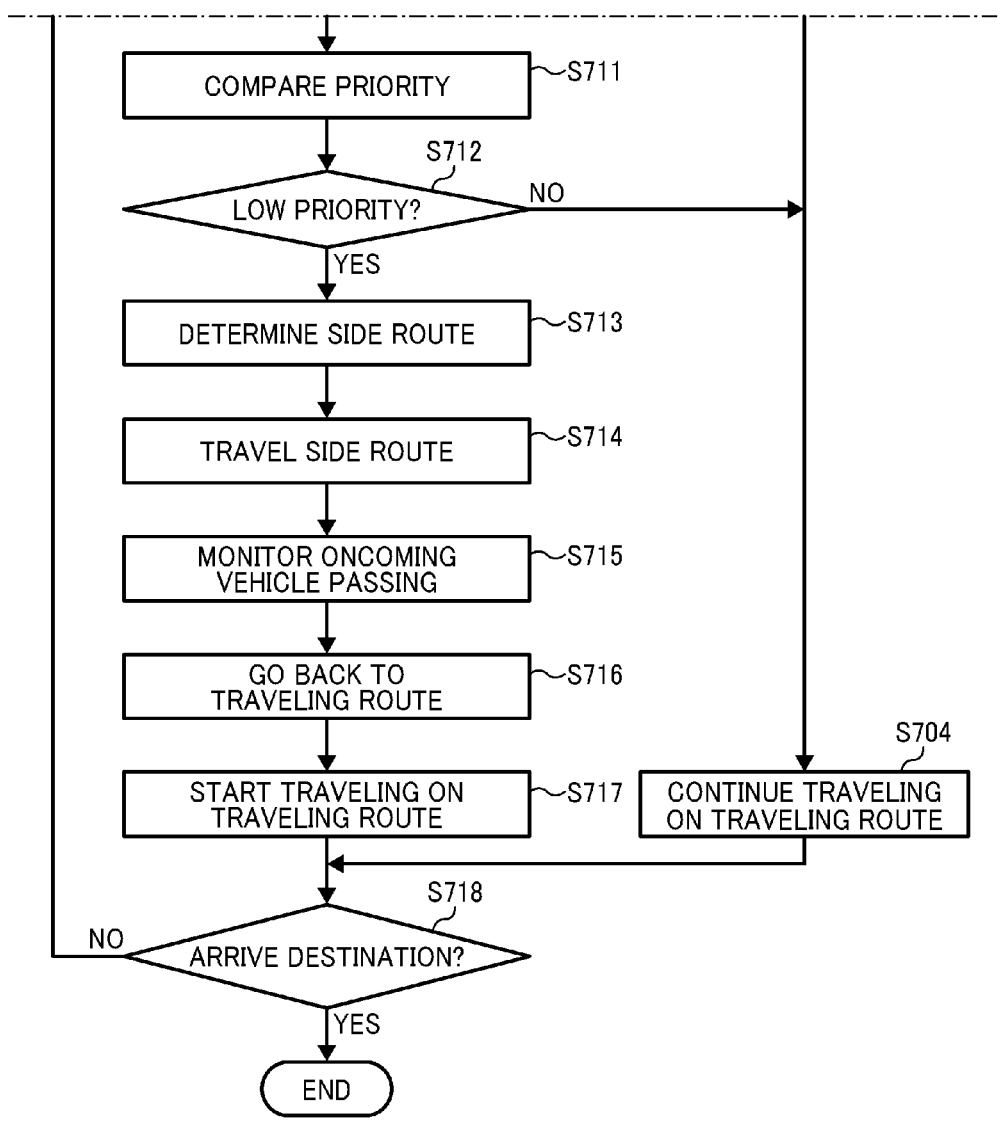

Referring now to FIGS. 10A-10B, operation of controlling travel of the AGV 1, performed by the AGV 1 of FIG. 9, is described according to an embodiment. The operation of FIG. 10 is substantially similar to the operation of FIG. 7, except for addition of S1003 to S1005, and replacement of S703 with S1006.

At S701, the traveling route determiner 133 determines a traveling route of the AGV 1.

At S702, the travel controller 135 causes the AGV 1 to start traveling according to the traveling route determined at S701.

At S1003, the location and direction measuring unit 136 measures a current location and a current traveling direction of the local AGV 1, to obtain the location information and direction information of the local AGV 1.

At S1004, the data notifier 138 transmits the location information and direction information obtained at S1003, and identification information of the local AGV 1 that is stored in the ID data memory 137, to the other AGV 1 through the wireless communication unit 119.

At S1005, the vehicle identifying unit 139 receives location information, direction information, and identification information of the other AGV 1, from the other AGV 1 via the wireless communication unit 119. At S1006, the vehicle identifying unit 139 determines whether there is any oncoming vehicle, based on the received location information and direction information.

When no oncoming vehicle is detected ("NO" at S1006), the operation proceeds to S704 to control the AGV 1 to continue traveling according to the traveling route. When any oncoming vehicle is detected ("YES" at S1006), the operation proceeds to S705 to identify the oncoming vehicle. More specifically, in this embodiment, the vehicle identifying unit 139 identifies the oncoming vehicle based on the identification information received at S1005.

The operation then proceeds to S706 to S718, and ends the operation when the AGV 1 reaches the destination ("YES" at S718).

As described above referring to FIGS. 9 and 10, in one embodiment, the AGV 1 detects an oncoming vehicle based on location information and traveling direction information of the other vehicle that is transmitted from the other vehicle, and identifies the oncoming vehicle based on identification information that is transmitted from the other vehicle. This improves accuracy in detecting and identifying the oncoming vehicle.

In any one of the above-described embodiments, the AGV 1 compares the travel priority of its own, with the travel priority of the oncoming vehicle.

Alternatively, as described below, the system management server 2 may compare the travel priorities among the plurality of AGVs 1. In this embodiment, the system management server 2 is able to oversee all of the AGVs 1 in the vehicle control system to determine a travel priority for each one of the AGVs 1. This further improves efficiency in transportation, and/or reduces transportation time.

Figure 11:
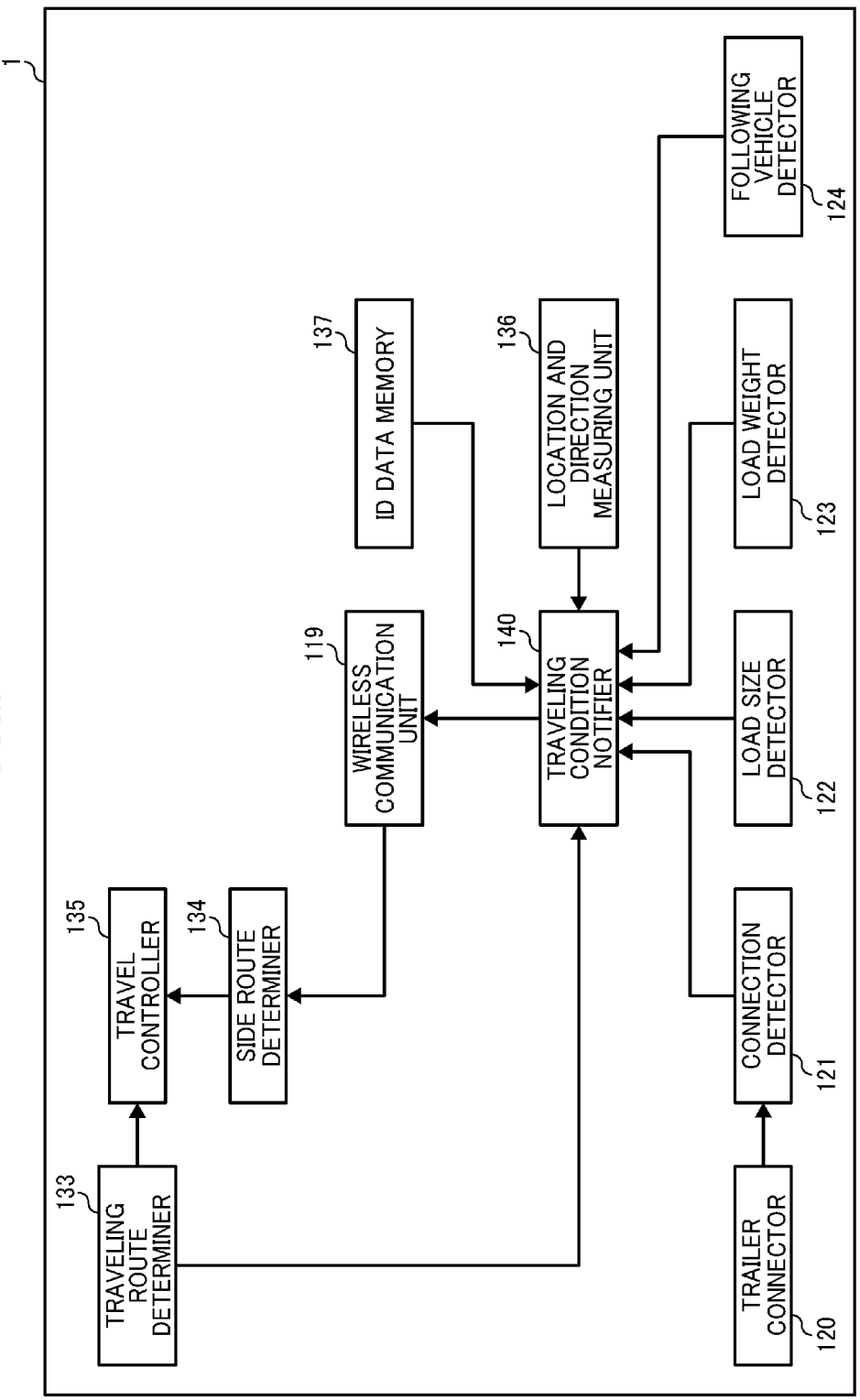
FIG. 11 is a schematic block diagram illustrating a functional configuration of the AGV, according to an embodiment.

Referring to FIG. 11, a functional configuration of the AGV 1 is described according to an embodiment. The AGV 1 of FIG. 11 includes the wireless communication unit 119, trailer connector 120, connection detector 121, load size detector 122, load weight detector 123, following vehicle detector 124, a traveling route determiner 133, a side route determiner 134, and a travel controller 135, the location and direction measuring unit 137, the identification (ID) data memory 137, and a travel condition notifier 140.

The travel condition notifier 140 transmits the identifier of the local AGV 1 that is stored in the ID data memory 137, and various travel conditions, to the system management server 2 through the wireless communication unit 119. Examples of various travel conditions include, but not limited to, information indicating connection to the trailer 6, the load size, the load weight, information indicating presence of any following vehicle, information indicating presence of the load, the traveling location, and the traveling direction.

Figure 12:
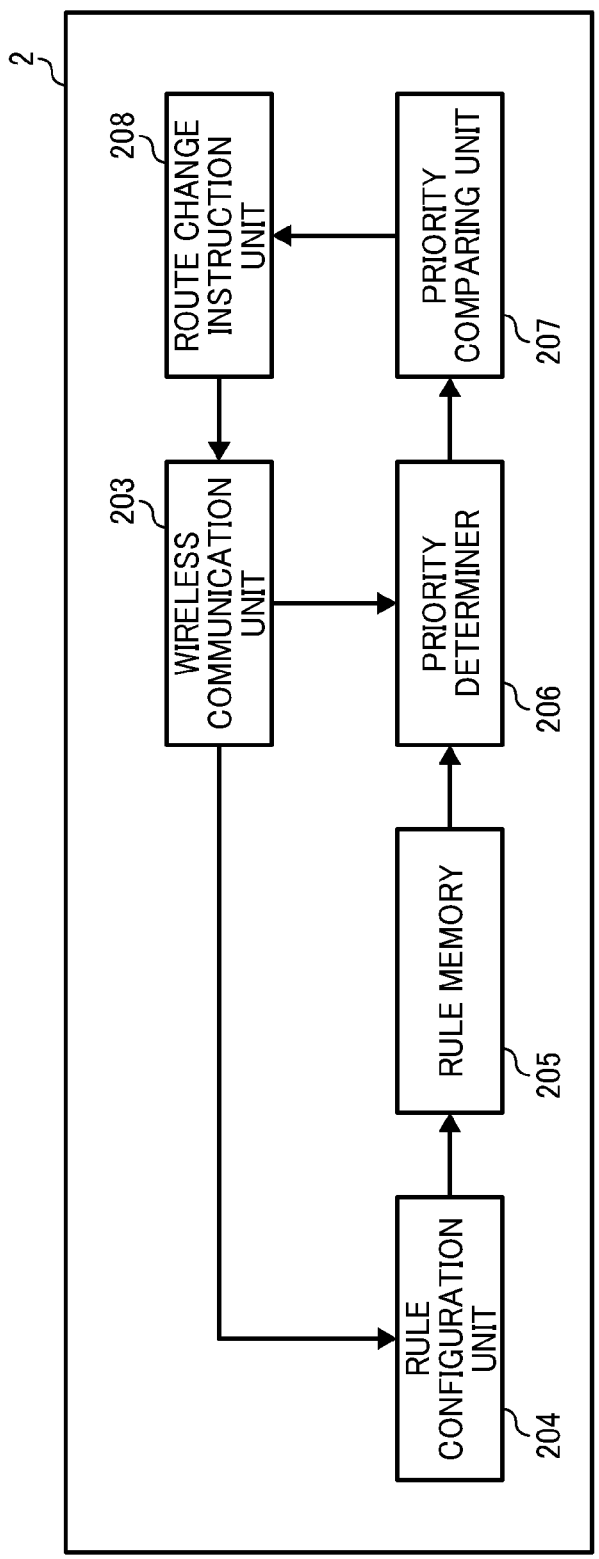
FIG. 12 is a schematic block diagram illustrating a functional configuration of the server, according to the embodiment.

Referring to FIG. 12, a functional configuration of the system management server 2 is described according to an embodiment. The system management server 2 includes a wireless communication unit 203, a rule configuration unit 204, a rule memory 205, a priority determiner 206, a priority comparing unit 207, and a route change instruction unit 208.

The wireless communication unit 203, implemented by the wireless IO 202, communicates with the AGV 1 through the wireless communication network 3.

The rule configuration unit 204, which may be implemented by the server controller 201, configures a rule to be used for determining the travel priority, according to a user operation input through the wireless communication unit 203, and stores the travel priority rule in the rule memory 205. The rule memory 205, which may be implemented by any desired memory of the server 2 such as the RAM 114, stores the travel priority rule.

The priority determiner 206, implemented by the server controller 201, obtains various travel condition information of the AGV 1 that is received from the AGV 1, and determines the travel priority of the AGV 1 according to the travel priority rule stored in the rule memory 205. The operation of determining the travel priority is described below referring to FIG. 8. While the operation of FIG. 8 is described in the case of performing operation at the AVG 1, the server controller 201 performs the operation of FIG. 8 in a substantially similar manner. Further, the AGV 1 determines a travel priority for each of AGVs 1 being managed by the server 2.

The priority comparing unit 207, implemented by the server controller 201, compares the travel priorities that are determined by the priority determiner 206 for the respective AGVs 1, among the AGVs 1. More specifically, when there are two AGVs 1 that are about to pass each other, the priority comparing unit 207 compares the travel priority between these two AGVs 1 to generate a comparison result.

When there are two AGVs 1 that are about to pass each other, the route change instruction unit 208 determines which one of the AGVs 1 should continue traveling, and which one of the AGVs 1 should go to a side route, based on the comparison result by the priority comparing unit 207. The route change instruction unit 208 then instructs the AGV 1, which should go to the side route, to go to the side route, through sending an instruction to the AGV 1 identified with the identification information. In response to the instruction, the AGV 1 performs S713 to S718 as described above.

When the server 2 centrally manages the travel priority for each one of the AGVs 1 in the system, even when the travel priority is updated at each AGV 1, such information is reflected in a timely manner, thus improving the accuracy in comparison result.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A driverless vehicle, comprising:
circuitry to:
determine a travel priority of the vehicle based on a travel condition of the vehicle, the travel condition indicating a condition of the vehicle in traveling according to a traveling route from one location to other location along a single guide path;
in response to detection of an oncoming vehicle ahead of the vehicle that travels in a direction opposite of a traveling direction of the vehicle along the single guide path, obtain a travel priority of the oncoming vehicle that is driverless;
compare between the travel priority of the vehicle, and the travel priority of the oncoming vehicle; and
select one of the vehicle and the oncoming vehicle to change the traveling route to a different traveling route, to allow an unselected one of the vehicle and the oncoming vehicle to continue traveling along the single guide path.

2. The driverless vehicle of claim 1, wherein the travel condition includes at least one of:
information indicating whether the vehicle is connected to a trailer;
information indicating whether the vehicle has a load mounted thereon;
information indicating a weight of the load;
information indicating a size of the load; and
information indicating whether the vehicle has at least one vehicle following the vehicle in the same direction.

3. The driverless vehicle of claim 1, wherein the circuitry identifies the oncoming vehicle that is detected ahead of the vehicle based on identification information obtained from the oncoming vehicle, the driverless vehicle further comprising:
a communication circuit to transmit the travel priority of the vehicle to the oncoming vehicle identified with the obtained identification information, and receive the travel priority of the oncoming vehicle from the oncoming vehicle identified with the obtained identification information, through a wireless network.

4. The driverless vehicle of claim 3, further comprising:
an identification reader that reads the identification information provided by the oncoming vehicle, wherein the circuitry identifies the oncoming vehicle based on the read identification information.

5. The driverless vehicle of claim 3, further comprising:
a location detector to detect a location of the vehicle,
wherein the communication circuit transmits first location information indicating the detected location of the vehicle to the oncoming vehicle, and receives second location information indicating a location of the oncoming vehicle detected at the oncoming vehicle, and
wherein the circuitry identifies the oncoming vehicle based on the received second location information.

6. The driverless vehicle of claim 3, further comprising:
a location detector to detect a location of the vehicle,
wherein the communication circuit transmits first location information indicating the detected location of the vehicle to the oncoming vehicle, and receives second location information indicating a location of the oncoming vehicle detected at the oncoming vehicle, and
wherein the circuitry detects the oncoming vehicle based on the received second location information.

7. The driverless vehicle of claim 1, wherein, when the vehicle is selected to change the traveling route,
the circuitry controls the vehicle to operate in an autonomous travel mode to freely travel based on detection of surroundings, at least for a time period until the oncoming vehicle passes.

8. A vehicle control apparatus for controlling travel of a plurality of driverless vehicles, the apparatus comprising:
a communication circuit to receive, from each one of the plurality of vehicles, a travel condition of the vehicle through a network, the travel condition indicating a condition of the vehicle in traveling according to a traveling route from one location to other location along a single guide path; and
circuitry to:
determine, for each one of the plurality of vehicles, a travel priority of the vehicle based on the travel condition of the vehicle;
in response to detection of a first vehicle and a second vehicle of the plurality of vehicles that are about to pass each other along the single guide path, compare between a first travel priority of the first vehicle and a second travel priority of the second vehicle; and
select one of the first vehicle and the second vehicle to change the traveling route to a different traveling route, to allow an unselected one of the first vehicle and the second vehicle to continue traveling along the single guide path.

9. The apparatus of claim 8, wherein
the communication circuit further receives, from each one of the plurality of vehicles, identification information identifying the vehicle, and
the circuitry identifies at least the first vehicle and the second vehicle with the identification information received from the first vehicle and the second vehicle.

10. The apparatus of claim 9, wherein
the communication circuit further receives, from each one of the plurality of vehicles, location information indicating a current location of the vehicle, and
the circuitry detects that the first vehicle and the second vehicle are about to pass each other, based on the location information received from the first vehicle and the second vehicle.

11. The apparatus of claim 8, wherein
the communication circuit further transmits an instruction for changing the traveling route to the selected one of the first vehicle and the second vehicle, to cause the selected one of the first vehicle and the second vehicle to operate in an autonomous travel mode to freely travel based on detection of surroundings at least for a time period until the unselected one of the first vehicle and the second vehicle passes.

12. The apparatus of claim 8, further comprising:
a memory to store a rule to be used for determining the travel priority.

13. A vehicle control system for controlling travel of a plurality of driverless vehicles, the system comprising circuitry to:
receive, from each one of the plurality of vehicles, a travel condition of the vehicle through a network, the travel condition indicating a condition of the vehicle in traveling according to a traveling route from one location to other location along a single guide path;
determine, for each one of the plurality of vehicles, a travel priority of the vehicle based on the travel condition of the vehicle;
in response to detection of a first vehicle and a second vehicle of the plurality of vehicles that are about to pass each other along the single guide path, compare between a first travel priority of the first vehicle and a second travel priority of the second vehicle; and
select one of the first vehicle and the second vehicle to change the traveling route to a different traveling route, to allow an unselected one of the first vehicle and the second vehicle to continue traveling along the single guide path.

14. The vehicle control system of claim 13, wherein, when the travel condition includes information indicating whether the vehicle is connected to a trailer, the circuitry determines the travel priority such that the vehicle connected to the trailer has a priority higher than that of the vehicle not connected to the trailer.

15. The vehicle control system of claim 13, wherein, when the travel condition includes information indicating whether the vehicle has a load mounted thereon,
the circuitry determines the travel priority such that the vehicle having the load mounted thereon has a priority higher than that of the vehicle not having the load mounted thereon, according to a first rule, and
the circuitry determines the travel priority such that the vehicle not having the load mounted thereon has a priority higher than that of the vehicle having the load mounted thereon, according to a second rule.

* * * * *